Figure 3:
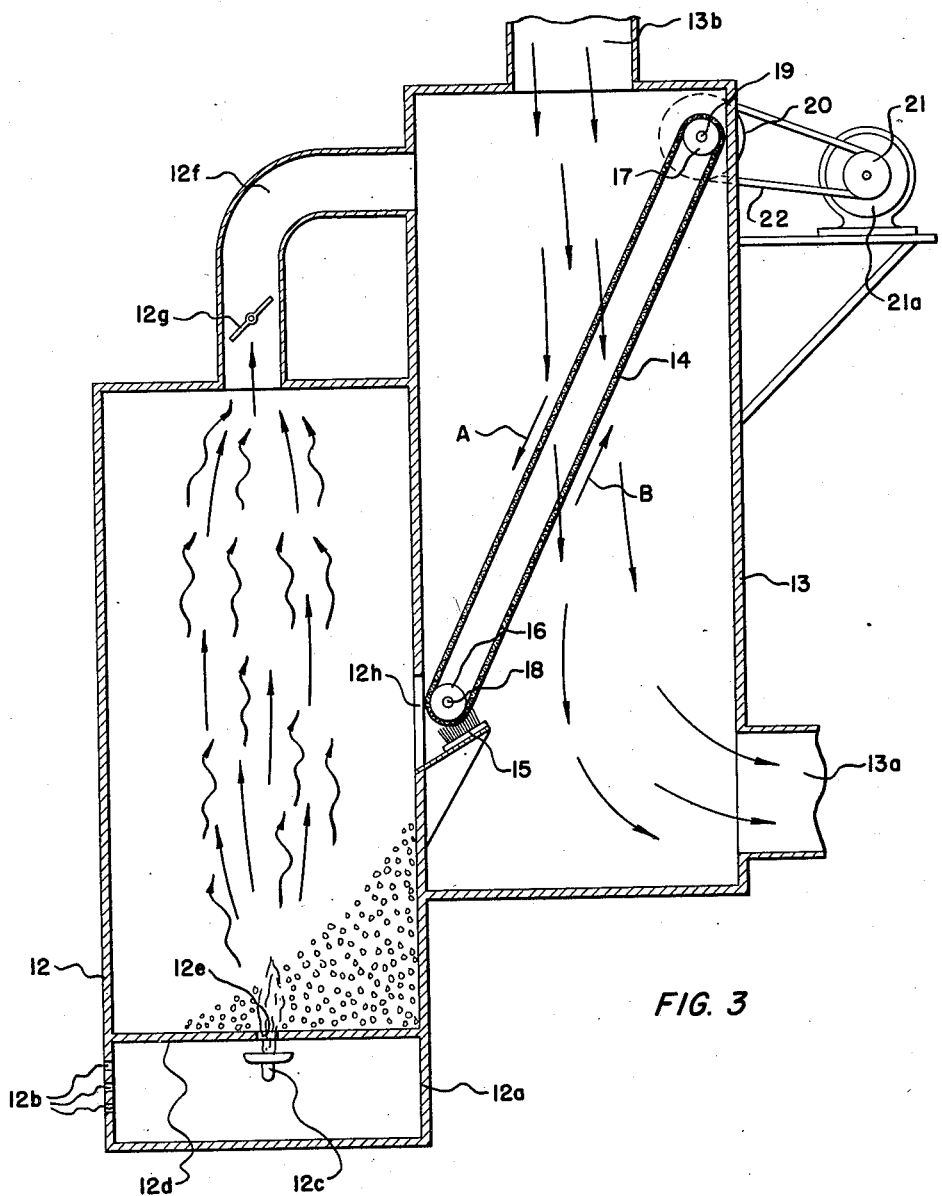

May 26, 1953          G. W. HARDY          2,639,780
CHAFF SEPARATOR AND FURNACE
Filed Feb. 14, 1950                    2 Sheets-Sheet 1
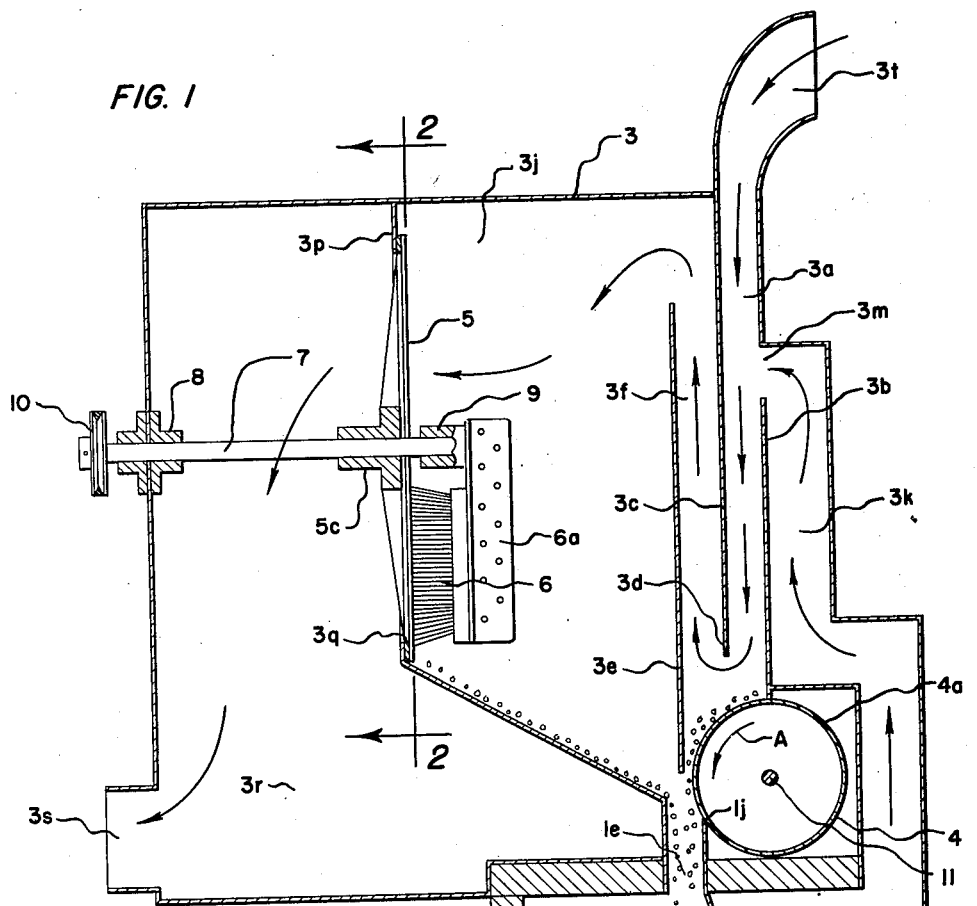
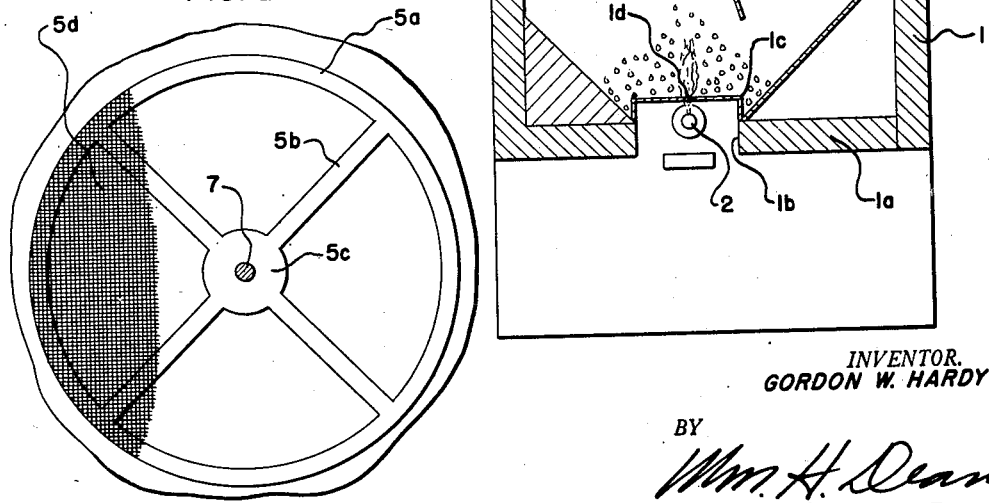
INVENTOR.
GORDON W. HARDY
BY
Wm. H. Dean
AGENT Patented May 26, 1953

2,639,780

UNITED STATES PATENT OFFICE 2,639,780

CHAFF SEPARATOR AND FURNACE

Gordon W. Hardy, Chula Vista, Calif.

Application February 14, 1950, Serial No. 144,187

2 Claims. (Cl. 183—6)

My invention relates to a chaff separator and furnace, more particularly for use in removing chaff or the like from an air stream or flue gases, and the objects of my invention are:

First, to provide a separator and furnace of this class which may be used intermediate a source of air laden with solids and an air cleaning device adapted to remove fine particles of foreign matter from air, whereby the separator and furnace cleans the air sufficiently to permit the same to be passed through an air cleaner without clogging the same;

Second, to provide a chaff separator and burner of this class which concurrently separates the chaff from the compressible fluids carrying the same and burns said chaff and delivers the products of combustion into the stream of compressible fluids which delivers the chaff to the burner, providing complete disposition of solids carried by a stream of compressible fluid;

Third, to provide a chaff separator and furnace of this class which is particularly adapted for use as an element in combination with air cleaning devices for the purpose of controlling smog emanating from industrial plants, such as those operated by the coffee industry, or the like;

Fourth, to provide a chaff separator and furnace of this class having a novel combination of a movable screen interposed in the path of the compressible fluids carrying chaff or the like, whereby chaff is removed from the air or other compressible fluid by the movable screen and is scrubbed from the screen by a brush, which causes the chaff to gravitate into a burner for disposition thereof;

Fifth, to provide a chaff separator and furnace of this class which has a novel moving screen and stationary brush, which removes chaff or other similar matter from a compressible fluid passing therethrough, whereby the brush prevents the screen from becoming clogged by continuously deposited foreign matter carried by the air passing through the screen;

Sixth, to provide a chaff separator and furnace of this class having a novel combination of means for separating the chaff from the compressible fluids passing through the separator, and means for burning the chaff and recirculating the fumes from the burning chaff, together with the ashes which are carried by the products of combustion, so that the chaff is burned and its products of combustion are also removed by the same means which separate the chaff from the compressible fluids carrying the same;

Seventh, to provide a chaff separator and burner of this class having a vertical passage at the lower end of which a roller is provided to receive impinging chaff and to rotatably remove said chaff from its surface by rotation in contiguous relationship to the edge of a scraper directly above a burner which causes combustion of the chaff; and Eighth, to provide a chaff separator and furnace of this class which is very simple and economical of construction, efficient in operation, and which will not readily deteriorate or get out of order.

With these and other objects in view, as will appear hereinafter, my invention consists of certain novel features of construction, combination and arrangement of parts and portions, and a certain modification, as will be hereinafter described in detail and particularly set forth in the appended claims, reference being had to the accompanying drawings and to the characters of reference thereon, forming a part of this application, in which:

Fig. 1 is a vertical sectional view of my chaff separator and furnace, showing parts and portions in elevation to facilitate the illustration; Fig. 2 is a fragmentary sectional view, taken from the line 2—2 of Fig. 1; and Fig. 3 is a vertical sectional view of a modified form of my chaff separator and burner.

Similar characters of reference refer to similar parts and portions throughout the several views of the drawings.

The fire box 1, burner 2, separator housing 3, drum 4, screen wheel 5, brush 6, shaft 7, bearings 8 and 9, pulley 10, and the drum shaft 11, constitute the principal parts and portions of my chaff separator and furnace.

In the construction of my chaff separator and furnace, I have provided a fire box 1 at the lowermost position in said chaff separator and furnace, in which the burner 2 is operated. It will be noted that the bottom 1a of the furnace 1 is provided with an opening 1b, covered by an inverted channel-shaped member 1c, having a small hole 1d in the middle thereof. The burner 2 is placed directly below the hole 1d and is a conventional gas burner or the like, adapted to emit an upwardly directed flame, which is drawn through the hole 1d, due to low pressure in the interior of the fire box 1.

The fire box 1 is provided with an inlet opening 1e in its upper side, adapted to admit chaff or the like, and adjacent this opening 1e is a scraper 1f, having its scraping edge 1j in substantially contiguous relationship with the periphery 4a of the drum 4. This drum 4 is rotatably mounted on the drum shaft 11, and may be rotated by any suitable motor, not shown in the drawings. The separator housing 3 is provided with a vertically disposed passage 3a, communicating at its lower end with the surface of the drum 4. This passage 3a is defined by walls 3b and 3c. The wall 3c, at its lower end portion 3d, terminates in vertically spaced relation to the surface of the drum 4, and parallel to the wall 3c is a wall 3e, which is spaced therefrom and extending vertically, providing a secondary passage 3f, which extends into the separating chamber portion 3j, which communicates with the screen wheel 5.

The housing 3 is also provided with a furnace flue gas passage 3k, which communicates with the first-mentioned passage 3a at 3m, and communicates at its lower end with the interior of the fire box 1. It will be noted that the communication of the furnace flue gas vent with the passage 3a is substantially above the surface of the drum 4, so that ash carried by the flue gases from the fire-box 1 may be forced downwardly into impinging relationship with the surface of the drum 4.

As shown in Fig. 1 of the drawings, the lower end of the wall 3e is slightly spaced from the periphery of the drum 4, providing an outlet for chaff carried on the surface of the drum 4 in the direction as indicated by the arrow A, so that the chaff may be delivered through the opening 1e into the fire box 1 over the burner 2.

The screen wheel 5 is mounted on a shaft 7, carried by bearings 8 and 9, supported in the separator housing 3, and this screen wheel 5 is provided with a peripheral ring portion 5a, having integral radiating spokes 5b supported by a central hub 5c on the shaft 7. One side of the screen wheel 5 is completely covered by a mesh screen 5d and the ring-shaped peripheral portion 5a of this screen wheel 5, at the opposite side thereof from the screen 5d, overlaps the partition 3p around the opening 3q therein. Thus, chaff-laden air which by-passes the drum 4 and tends to pass through the screen 5d of the wheel 5, must pass through the screen 5d to enter the exit chamber 3r before passing through the outlet 3s. It will be noted that the outlet 3s of the housing 3 communicates with the intake of an air cleaning device or the like, whereby partial vacuum is created within the housing 3, which causes the flame from the burner 2, hereinbefore described, to be drawn into the fire box 1 through the hole 1d. The brush 6, as shown in Fig. 1 of the drawings, is arranged in contiguous relationship with the screen 5d of the screen wheel 5.

This brush 6 is supported by a bracket 6a extending from the inner side wall of the housing 3, and as shown in Figs. 1, this bracket 6a also supports the bearing 9. The inlet 3t of the housing 3 communicates with the exhaust stack of a coffee roasting furnace, or any other industrial installation, which emits a compressible fluid laden with certain solid materials which are combustible.

The operation of my chaff separator and furnace is substantially as follows:

When the air cleaner or centrifugal blower hereinbefore described, and which is no part of my present invention, is creating a partial vacuum in the casing 3 and forcing the compressible fluids to move in a direction as indicated by the arrows, chaff-laden smoke or air is drawn downwardly into the casing 3 vertically through the passage 3a and the solid materials, such as chaff, impinge upon the roller 4, which rotates in the direction as indicated by the arrow A, causing the same to be scraped off by the scraper 1j, which forces the materials to be deposited into the firebox 1, around the opening 1d above the burner 2, which emits a flame which is drawn through the opening 1d for burning the chaff or the like in the fire box 1. It will be here noted that some of the solids carried by the air or gas stream passing vertically and downwardly in the passage 3a may be slightly sticky or damp and tend to adhere to the surface of the roller 4, which is neatly cleaned by the scraper edge 1j, which prevents the clogging of chaff near the lower end of the passage 3a around the roller 4.

It will be noted that chaff is burned in the fire box 1 and the flue gases and ashes pass upwardly through the passage 3k and into the passage 3a through the opening 3m. Any ashes carried by the flue gases may be collected with the chaff on the drum 4 and returned to the fire box 1. However, any chaff or ash which is carried upwardly through the passage 3f is collected on the screen 5d of the screen wheel 5, which is continually rotated by means of the pulley 10, driven by a motor not shown in the drawings. As the screen wheel 5 rotates in contiguous relationship to the brush 6, chaff and ashes which collect on the screen 5d are dislodged and gravitate downwardly through the opening 1e and into the fire box 1, above the burner 2. The air which passes through the screen 5d is conducted through the outlet 3s to the air cleaner, which, as hereinbefore described, draws a partial vacuum thereon.

The modification, as shown in Fig. 3 of the drawings, has the parts designated as follows: The fire box 12, separator casing 13, screen 14, brush 15, rollers 16 and 17, shafts 18 and 19, pulleys 20 and 21, and the belt 22.

The fire box 12, as shown in Fig. 3 of the drawings, is provided with a burner compartment 12a in its lowermost portion, which is provided with fresh air vents 12b, adapted to furnish oxygen to the burner 12c, positioned below the bottom portion 12d of the fire box 12. In the bottom 12d, near the middle thereof, is an opening 12e, adapted to admit flame from the burner 12c, which is drawn into the fire box 12 by means of a partial vacuum created at the intake of a centrifugal blower, not shown in the drawings, but which is connected in communicative relationship with the outlet 13a of the separator casing 13.

Communicating with the interior of the fire box 12 at its uppermost portion is the vent pipe 12f, having a damper 12g therein. The opposite end of this vent pipe 12f communicates with the upper interior of the separator casing 13, adjacent the intake 13b thereof, into which chaff-laden air is admitted during operation of the centrifugal blower hereinbefore described. Diagonally disposed within the separator casing 13 is the endless screen 14, positioned over the rollers 16 and 17, which are rotatably mounted about the axes of the shafts 18 and 19, respectively.

The shaft 19 is provided with a pulley 20 on its extending end, which projects from the separator casing 13 and engaging the pulley 20 is a belt 22, which also engages the pulley 21 on the motor 21a, which drives the rollers 16 and 17 and the screen 14, engaged thereby. The stationary brush 15 is provided with bristles contiguous with the screen 14 on the roller 16, and adjacent this brush 15 the fire box 12 is provided with an opening 12h, through which chaff passes from the screen 14 after being scrubbed therefrom by the brush 15.

The operation of the modification as shown in Fig. 3 of the drawings is substantially as follows:

When the centrifugal blower, not shown in the drawing and which is no part of my present invention, creates a partial vacuum on the outlet conductor 13a of the separator casing 13, flue gas or other compressible fluid enters the intake conductor 13b of the separator casing 13, carrying with it various solids, such as chaff or the like, which impinge upon the screen 14. The screen 14 moves as indicated by the arrows A, in its engaged relationship with the rollers 16 and 17, which are driven by the motor 21a. The chaff which impinges upon the screen 14 is carried downwardly and a certain proportion thereof falls through the opening 12h into the fire box 12 adjacent the opening 12e in the bottom thereof, through which the flame from the burner 12c is drawn. The brush 15, in its stationary position, scrubs moist or sticky chaff or other solids from the screen 14, so that each cycle of movement of the screen 14 around the rollers 16 and 17 cleans the screen and presents a foraminous structure, through which the air may pass from the separator casing inlet 13b to the separator casing outlet 13a.

It will be here noted that the fumes rising in the fire box 12, as indicated by wavy arrows, pass upwardly through the conductor 12f and into the separator casing 13 and mix with the air or fumes entering through the inlet conductor 13b. Any ashes carried by the fire box fumes are caught on the screen 14 and returned to the fire box, so that the recirculation of solids continues until they become sufficiently fine to pass through the screen 14. The mesh of the screen 14 is sufficiently fine to correspond to the structure of the air cleaner hereinbefore described as a centrifugal blower, the intake of which communicates with the outlet conductor 13a of the separator casing 13.

Though I have shown and described a particular construction, combination and arrangement of parts and portions, and a certain modification, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a chaff separator and furnace, a casing having an inlet conductor and an outlet conductor, said casing having vertical wall portions defining a substantially vertical passage communicating directly with said inlet conductor, a rotatable drum at the lower end of said passage, a fire box below said drum and having an opening in the upper portion thereof communicating with the periphery of said drum below said passage, a scraper adjacent the periphery of said drum and extending toward said fire box near the opening in the upper portion thereof, said passage terminating a short distance above said drum and communicating with said outlet conductor, a movable screen intermediate said passage and said outlet conductor, and brush means engaging said screen for continuously cleaning the same.

2. In a chaff separator and furnace, a casing having an inlet conductor and an outlet conductor, said casing having vertical wall portions defining a substantially vertical passage communicating directly with said inlet conductor, a rotatable drum at the lower end of said passage, a fire box below said drum and having an opening in the upper portion thereof communicating with the periphery of said drum below said passage, a scraper adjacent the periphery of said drum and extending toward said fire box near the opening in the upper portion thereof, said passage terminating a short distance above said drum and communicating with said outlet conductor, a movable screen intermediate said passage and said outlet conductor, and brush means engaging said screen for continuously cleaning the same, means below said brush means extending to said opening in the upper portion of said fire box for conducting solid materials brushed from said screen into said fire box.

GORDON W. HARDY.

References Cited in the file of this patent

UNITED STATES PATENTS

| Number | Name | Date |
| --- | --- | --- |
| 975,391 | Blaik | Nov. 15, 1910 |
| 1,493,789 | Mullen | May 13, 1924 |
| 1,747,676 | Kerr | Feb. 18, 1930 |
| 1,949,002 | Annis | Feb. 27, 1934 |
| 2,211,812 | Colbert | Aug. 20, 1940 |

FOREIGN PATENTS

| Number | Country | Date |
| --- | --- | --- |
| 188,698 | Germany | Sept. 12, 1907 |